Nov. 10, 1970  A. R. BURCH  3,539,889
MEANS FOR CONTROLLING MOTOR DRIVEN VEHICLES
Filed Feb. 12, 1968
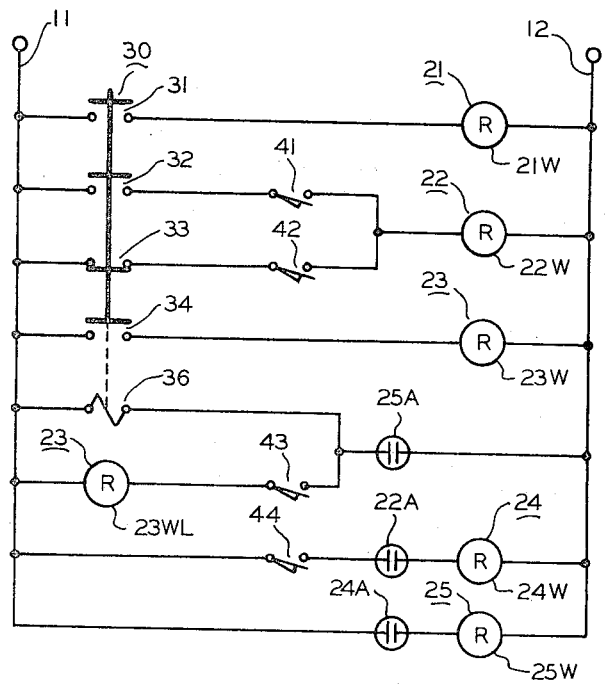
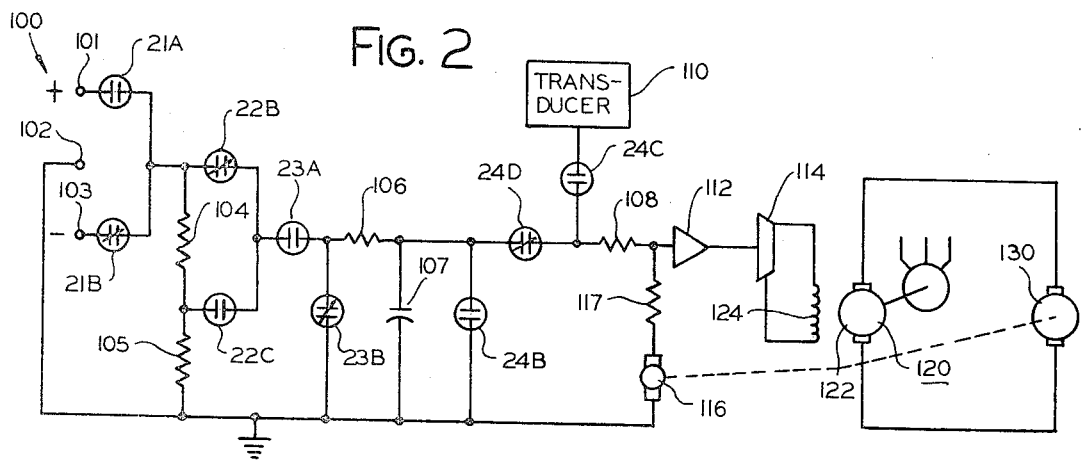
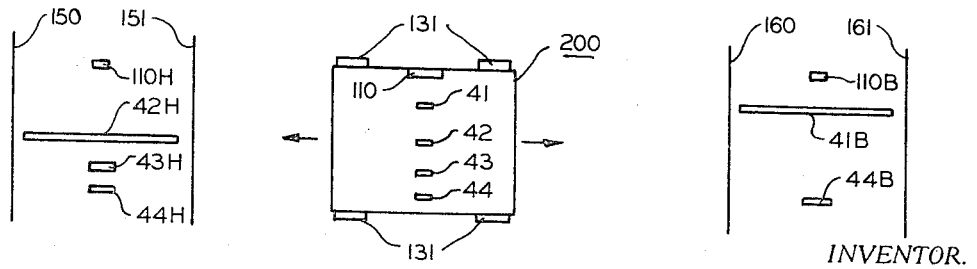
INVENTOR.
ARTHUR R. BURCH
BY R J Falbowski
ATTORNEY

United States Patent Office 3,539,889
Patented Nov. 10, 1970

3,539,889
MEANS FOR CONTROLLING MOTOR DRIVEN VEHICLES
Arthur R. Burch, Battle Creek, Mich., assignor to Clark Equipment Company, a corporation of Michigan
Filed Feb. 12, 1968, Ser. No. 704,741
Int. Cl. H02p 5/22
U.S. Cl. 318—143                    4 Claims

ABSTRACT OF THE DISCLOSURE

A vehicle driven by an electric motor powered by a generator is movable between two stations. The generator output voltage and polarity are controlled to control the direction and velocity of the vehicle. Magnetic sensing elements are located adjacent each of the two stations and switches on the vehicle sense the proximity of the magnets to selectively open and close and provide control signals to control the generator output through an electrical servo system using a direct current source as the control signal source. The control signal source is applied through a resistance-capacitance circuit that integrates the electrical control signal applied to the generator to start the vehicle towards a selected station and control its acceleration. Upon approaching the second station, the switches operate to connect a lower level of the direct current source into the system. This lower level signal is similarly integrated to control the deceleration of the vehicle. To move the vehicle back to the initial position, the control system is activated to connect the opposite polarity of the direct current source into the system in the same manner, but resulting in movement of the vehicle in the opposite direction.

---

This invention relates to control systems for moving electrically powered vehicles used in material handling or similar systems, particularly to such systems where the vehicle operates to move between and stop at preselected stations.

Systems in which this invention can be applied are described in copending application Ser. No. 543,224, Apr. 18, 1966, Automatic Warehousing Method and Means, and Ser. No. 543,229, Apr. 18, 1966, Automatic Material-Unit Storage and Method. These applications disclose material handling storage systems that utilize electrical motor driven vehicles that transport material from one storage bin to another. To control the movement of the vehicle from one station to another, a servo system is usually utilized to control the driving motor and speed and direction of rotation. This invention is particularly usable in such systems that utilize an electrical motor controlled by the output of a direct current generator wherein the motor rotates at a speed proportional to the generator output and in a direction determined by the polarity of the generator output.

This invention provides means for controlling the acceleration of a material handling or similar vehicle from a standstill at a first selected station to a selected maximum speed and for controlling the deceleration of the vehicle from the selected maximum speed to standstill to place the vehicle at a second selected station. Generally, this is accomplished by using an electrical servo system controlled by a direct current control signal that is amplified and applied to the field winding of a direct current generator that supplies power for a driving motor. The direct current signal is applied at selected levels through an integration, or low pass filter, circuit to provide a gradually increasing or decreasing voltage at a selected rate of change to the field winding of the generator to control the motor speed and direction and, thereby, the deceleration and direction of movement of the vehicle.

The objects and advantages of the invention will appear from the following description.

FIG. 1 is a schematic of part of a system for controlling a vehicle according to this invention;

FIG. 2 is a schematic of a part of the system that is controlled by the portion of the system shown in FIG. 1; and FIG. 3 is a simplified drawing of a vehicle and the related portions of the system diagrammatically showing the switches and magnets used to control the movement of the vehicle between two selected stations.

Referring to FIGS. 2 and 3, a material handling or similar type vehicle 200 is supported on wheels 131 connected in any known manner (not shown) to be rotated in either direction by a motor 130 (FIG. 2) to move vehicle 200 between a first, initial or home, position or station, diagrammatically illustrated, between lines 150 and 151, and a second, or bin, position, or station, diagrammatically illustrated between lines 160 and 161. A means for driving motor 130 comprises an electrical energy generating means such as a generator 120, having an armature winding 122 and a field winding 124, that is driven by an alternating current motor 128, an amplifying means comprising a summing amplifier 112 and a power amplifier 114, and a means for connecting an electrical control source to the amplifying means comprising portions of the circuit shown in FIGS. 1, 2, and 3.

The generator output level determines the speed of rotation of motor 130 and the generator output polarity determines the direction. The output level of generator 120 is determined by the magnetic flux in field winding 124 which is controlled by varying the magnitude and polarity of the output of power amplifier 114 which is applied to field winding 124. The output of power amplifier 114 is controlled by the input control signal received in its input circuit from summing amplifier 112. The input to summing amplifier 112 is received from a servo system, shown in FIG. 2, that comprises a direct current source 100 having a positive output terminal 101, a ground, or common, terminal 102, a negative terminal 103, and a voltage divider made up of a resistor 104 and a resistor 105. The servo system is controlled by several relays and contacts that are responsive to various conditions primarily indicating the speed of the vehicle and the position of the vehicle relative to its initial and second position.

Referring to FIG. 1, an electrical energy source 10 supplies electrical energy along conductors 11 and 12 for operation of the circuitry shown. A main start switch 30 has three normally open contacts 31, 32 and 34 and a normally closed contact 33. Main switch 30 is of the type that upon being pushed assumes the other position from that shown in FIG. 1 and is latched in that position unless an unlatch winding 36 is energized to unlatch the switch. Typically, switch 30 is biased by a spring (not shown) to the position shown in FIG. 1 and a latch is connected to lock the switch in the other position after it is pushed. Upon energization of winding 36, the latch is removed and the spring moves switch 30 back to the initial position shown in FIG. 1.

Contact 31 controls the energization of a polarity selection relay 21 that comprises a winding 21W (FIG. 1) and a normally open contact 21A and a normally closed contact 21B (FIG. 2).

Contacts 32 and 33 and two reed switches 41 and 42 control the energization of a source level selection relay 22 that comprises a winding 22W, a normally open contact 22A (FIG. 1), and a normally closed contact 22B and a normally open contact 22C (FIG. 2).

Contact 34 controls the energization of a main connecting relay 23 which is of the latching type and comprises a main winding 23W and an unlatching winding 23WL (FIG. 1), a normally open contact 23A, and a normally closed contact 23B (FIG. 2). The energization of winding 23W moves the contacts of relay 23 to an energized position in which they are maintained by a latch regardless of the energization or deenergization of winding 23W until winding 23WL is energized with winding 23W deenergized to remove the latch.

A fine positioning relay 24 is connected to be energized through the closing of a reed switch 44 and contact 22A of relay 22 and comprises a winding 24W, a normally open contact 24A (FIG. 1), normally open contacts 24B and 24C, and a normally closed contact 24D (FIG. 2).

A reinitiating relay 25 is connected to be energized by the closing of contact 24A of relay 24 and is a time delay relay that upon energization does not close its contact until after a preselected time interval. Relay 25 comprises a relay winding 25W and a contact 25A. Contact 25A controls the energization of winding 36 and controls the energization of winding 23WL through a reed switch 43.

As shown in FIG. 2, elecrical energy source 100 supplies a direct current control signal at a preselected level through a means for selecting the control signal polarity comprising relay 21 and its contacts 21A and 21B, and a means for selecting a high or low level signal comprising relay 22 and its contacts 22B and 22C and the voltage divider made up of resistors 104 and 105.

A means for integrating the control signal comprises a time-magnitude related electrical energy storage circuit, or filter circuit, that comprises a resistor 106 and a capacitor 107. The means for integrating provides a controlled delayed buildup of the control voltage input to the amplifying means at a selected time-voltage function.

A means for connecting the integrated control signal to the amplifying means comprises relay 23 and its contacts 23A and 23B, and relay 24 and its contacts 24B, 24C and 24D. With contact 23A closed and contact 23B open, the control signal is supplied to the system and the integrating means is activated. With contact 23A open and contact 23B closed, the control signal is disconnected from the servo system and capacitor 107 discharges through resistor 106 and contact 23B. With relay winding 24W deenergized, contact 24D is closed and, if contact 23A is closed, the signal from the direct current source at the selected level is applied as an input to amplifier 112. The energization of relay winding 24W opens contact 24D, closes contact 24B to discharge capacitor 107, and closes contact 24C to connect a fine positioning means that provides a fine positioning signal as the input to summing amplifier 112.

The fine positioning means comprises a transducer 110 (FIGS. 2 and 3) that applies an input signal to amplifier 112 indicating the position of vehicle 200 relative to the selected position to closely sense the position of the vehicle and effect placement of the vehicle at the desired position. A type of transducer controlled positioning system that may be used is described in copending application, Ser. No. 514,556, Dec. 17, 1965, Transducer.

Referring to FIG. 3, reed switches 41, 42, 43 and 44 (schematically shown in FIG. 1) are of the type that close when within a magnetic field and are mounted on vehicle 200 to sense the proximity of appropriately placed magnetic strips, as shown. The magnetic field for effecting operation of these switches is provided at the initial, or home position between lines 150 and 151 by magnetic strips 42H, 43H, and 44H. Magnetic strip 42H is located to appropriately close reed switch 42, magnetic strip 43H is located to appropriately close reed switch 43, and magnetic strip 44H is located to appropriately close reed switch 44. Similarly, in the second, or bin, position located between lines 160 and 161, a magnetic strip 41B is located to appropriately close reed switch 41, and a magnetic strip 44B is located to appropriately close reed switch 44.

A fine control strip 110H between lines 150 and 151 and a fine control strip 110B between lines 160 and 161 control the operation of transducer 110, FIG. 3, to finally position the vehicle at the initial or second position, respectively.

In the operation of the system, with vehicle 200 in the initial position, between lines 150 and 151, and with start switch 30 in the open position as shown in FIG. 1: relay winding 21W is deenergized because contact 31 is open, relay winding 22W is energized because contact 33 is closed and reed switch 42 is closed (by magnetic strip 42H), relay winding 23W is deenergized because contact 34 is open, winding 36 is energized because contact 25A is closed, relay winding 24W is energized because contact 22A is closed and reed switch 44 is closed (by magnetic strip 44H), and relay winding 25W is energized (to close contact 25A) because contact 24A is closed. With initial energization of conductors 11 and 12 and the vehicle at the home position, the positions of the contacts in the servo system are immaterial except that contacts 23A and 24D are open and there is no signal from transducer 110 because the vehicle is on station at the selected position.

To move the vehicle from the initial position between lines 150 and 151 to another selected station such as to the second position between lines 160 and 161, start switch 30 is pushed to close contacts 31, 32 and 34 and open contact 33 to thereby energize relay windings 21W and 23W and deenergize relay windings 22W, 24W and 25W. The deenergization of winding 25 opens contact 25A to deenergize winding 36 to latch switch 30 in the depressed position and to deenergize winding 23WL to latch the contacts of relay 23 in their energized position.

As shown in FIG. 2, the energization of relay winding 21W closes contact 21A and opens contact 21B to apply a positive polarity control signal into the system. The deenergization of relay winding 22W closes contact 22B and opens contact 22C to select the high level control signal. The energization of relay 23 closes contact 23A and opens contact 23B to apply the potential selected by relays 21 and 22 through the integrating means to contact 24D. The deenergization of relay 24 closes contact 24D and opens contacts 24B and 24C to deliver the integrated signal from source 100 to summing amplifier 112 through a resistor 108. The opening of contact 24B opens the shunt across capacitor 107 so that it may be charged and the opening of contact 24C disconnects transducer 110 from amplifier 112.

The signal from source 100 and from a tachometer generator 116 through a resistor 117 is amplified by summing amplifier 112 and is further amplified by amplifier 114 to a level sufficient to control the output of generator 120 in the desired range. Tachometer generator 116 is connected to produce an output varying as a function of the speed of motor 130 in a manner known in the art. The output of power amplifier 114 is directly proportional to, or varies as a function of its input signal, has a polarity determined by the polarity of its input signal, and controls the output of generator 120. Motor 130 produces a torque proportional to or varying as a function of the output of generator 120 in a direction determined by the polarity of the output of generator 120. Thus, the speed of motor 130 is controlled by the magnitude of the integrated signal applied from source 100 and the direction is determined by the polarity selected from source 100.

The application of the control signal starts motor 130 rotating, at a selected acceleration rate as capacitor 107 charges, to move vehicle 200 to the right as shown in FIG. 3. The movement of vehicle 200 is at a controlled acceleration rate determined by the time-magnitude, or time-voltage, function selected by selecting the values of the associated components in the system and the level of the control signal. The acceleration of vehicle 200 continues until the maximum selected velocity is reached which occurs when capacitor 107 is charged substantially to the voltage applied from source 100.

As vehicle 200 moves from its initial position to the right, reed switches 43 and 44 open as they move away from their respective corresponding magnetic strips 43H and 44H, and switch 42 opens as it moves away from its corresponding magnetic strip 42H. When the vehicle approaches the second position, it reaches a point where reed switch 41 is closed by the effect of magnetic strip 41B. At this point, vehicle 200 is moving at its maximum selected velocity and the control signal input to amplifier 112 is substantially at the level of terminal 101, the maximum selected level of source 100. When switch 41 closes, relay winding 22W is energized, because contact 32 is closed, to close contact 22A, open contact 22B, and close contact 22C.

The closing of contact 22A has no immediate effect upon the system because reed switch 44 is open. The opening of contact 22B and the closing of contact 22C applies the low level control signal, determined by the values of resistors 104 and 105, to the input of summing amplifier 112 through the integrating means or circuit. Upon this connection being made, the voltage drops at a rate determined by the low level control signal voltage and the discharge rate of capacitor 107 through the connected portions of the circuitry. Therefore, the shift from the high level signal to the low level signal is also integrated at a preselected rate to provide a controlled deceleration of the vehicle down to a selected velocity determined by the low level signal voltage.

Vehicle 200 continues at the reduced velocity (actually for a very short time) until the arrival of the vehicle approximately at the second position when reed switch 44 is closed by magnetic strip 44B. Since contact 22A is closed, the energization of reed switch 44 energizes winding 24W. The energization of relay winding 24W closes contact 24A to energize relay winding 25W of time delay relay 25, opens contact 24D to disconnect the integrating circuit and the control signal source from amplifier 112, closes contact 24B to shunt capacitor 107, and closes contact 24C to connect the transducer output as an input to summing amplifier 112. Transducer 110 senses its position relative to sensing strip 110B and produces a signal that effects operation to center the vehicle within the second position between lines 160 and 161.

The delay of the closing of contact 25A after energization of relay winding 25W is typically selected to assure that the vehicle has been positioned and stopped and that the loading and unloading operation is completed before the system cycles to return the vehicle to its home or first position. In practice, where many bins would be utilized, the time delay could be replaced by a sensing system that responds to the completion of a loading or unloading cycle and starts the vehicle returning to its original position. After the selected time delay, contact 25A closes to energize winding 36 and thereby release the latch on switch 30 and return switch 30 to the position shown in FIG. 1. Since reed switch 43 is open, relay winding 23WL remains deenergized and the contacts of relay 23 remain latched.

The movement of switch 30 to the position shown in FIG. 2 causes deenergization of relay windings 21W, 22W (reed switch 42 is open because it is not opposed by a magnetic strip in the bin position), and 23W. The deenergization of relay winding 21W opens contact 21A and closes contact 21B to connect the negative control signal from direct current source 100 into the system. The deenergization of relay winding 22W opens contact 22C and closes contact 22B to connect the high level control signal into the system and opens contact 22A to deenergize relay winding 24W. The deenergization of relay winding 24W opens contacts 24B and 24C and closes contact 24D to connect the selected level from source 100 to summing amplifier 112, and opens contact 24A to deenergize relay winding 25W and open contact 25A. The deenergization of relay winding 23W has no effect because the contacts of relay 23 remain in the energized position because unlatching winding 23WL is not energized.

Power amplifier 114 now supplies an amplified integrated control signal to generator field winding 124 in a polarity opposite to that applied when the vehicle was moved from the initial posiiton. As a result, the vehicle moves in the opposite direction at a controlled acceleration as the input voltage to summing amplifier 112 builds up, that is, vehicle 200 starts moving to the left as illustrated in FIG. 3.

As vehicle 200 moves away from the second position, reed switch 44 opens and, upon movement further away from the bin position, reed switch 41 opens without having an immediate effect upon the operation of the circuitry. The vehicle moves at its selected velocity until reed switch 42 is closed by the effect of magnetic strip 42H as the vehicle approaches the initial position. The closing of reed switch 42 energizes relay winding 22W through closed contact 33 to close contact 22A (this has no effect because reed switch 44 is open) and to open contact 22B and close contact 22C and connect the low level negative control signal into the system and the vehicle decelerates as the signal change is integrated. The vehicle thus decelerates to its slow selected speed at a selected rate of deceleration. As the vehicle approaches the initial position, reed switches 43 and 44 are closed by the magnetic field of magnetic strips 43H and 44H, respectively.

The closing of reed switch 43 has no immediate effect because contact 25A is open. The closing of reed switch 44 energizes relay winding 24W through closed contact 22A to close contact 24A and energize relay winding 25W and start the timing cycle of relay 25, to close contact 24B and discharge capacitor 107, to open contact 24D and disconnect summing amplifier 112 from the input circuit, and to close contact 24C and connect the output from transducer 110 indicating the vehicle position relative to fine control strip 110H to the summing amplifier to provide a fine positioning signal.

After the timing out of relay 25, relay winding 25W is energized to close contact 25A. The closing of contact 25A energizes winding 36 which has no effect because switch 30 is already in its open position and, since reed switch 43 is closed, energizes relay winding 23WL to unlatch relay 23 and allow contacts 23A and 23B to assume their normal position with contact 23A open and contact 23B closed. This disconnects source 100 from the integrating means and the amplifying means. At this point in the description, the system is as it was at the start of the description with the vehicle in the initial position. Switch 30 could now be depresed to start the cycle again.

While this specification contains a written description of the invention and the manner and process of working and using it and sets forth the best mode contemplated by me of carrying out my invention, there are many variations, combinations, alterations, modifications of the invention that can be made within the spirit of the invention and the scope of the appended claims.

I claim:
1. Means for controlling movement of a motor driven vehicle comprising:
an electrical control signal source having a high level output and a low level output of one polarity and another polarity,
means for integrating the control signal at a selected time-magnitude function;
means for driving the motor comprising an electrical generating means having an output varying as a function of its input and connected to drive the motor with the geerating means output,
means for connecting the high level output of the signal source of the one polarity as an input to the generating means through the means for integrating to thereby energize the electric motor with the generating means output to move the vehicle in an initial direction,
means responsive to the approach of the vehicle to a selected position for disconnecting the high level out- put of the signal source from the generating means input circuit and connecting the low level output of one polarity as an input to the generating means through the means for integrating, positioning means responsive to the placement of the vehicle relatively close to the selected position for providing a fine control signal indicating the movement required to move the vehicle to said selected position, means responsive to the arrival of the vehicle approximately at the selected position for disconnecting the signal source as an input to the generating means and connecting the positioning means to deliver the fine control signal as an input to said generating means, means for connecting the signal source high level output of the other polarity as an input to the generating means through the means for integrating when movement of the vehicle to a selected second position in a direction opposite to the initial direction is to be accomplished, means responsive to the approach of the vehicle to the second position for disconnecting the high level output and connecting the low level output of the other polarity as an input to the generating means through the means for integrating, and means responsive to the arrival of the vehicle approximately at the second position for disconnecting the signal source as an input to the generating means and connecting the positioning meas to deliver the fine control signal as an input to said generating means, 2. Means for controlling movement of a motor driven vehicle according to claim 1 wherein said electrical control signal source is a direct current source having a high and low level positive output and a high and low level negative output.

3. Means for controlling movement of a motor driven vehicle according to claim 2 wherein said electrical generating means comprises a direct current generator connected to drive the motor at a speed varying as a function of the generator output voltage and in a direction determined by the generator output polarity and having a field winding with said generator adapted to provide a generator output voltage varying as a function of the electrical voltage applied across said field winding and having a polarity determined by the polarity of said electrical voltage.

4. Means for controlling movement of a motor driven vehicle according to claim 3 also comprising amplifying means having an input circuit and having an output circuit connected to the field winding to apply a direct current voltage to the field winding varying as a function of the input voltage to said input circuit and with a polarity determined by the polarity of said input voltage and connected to receive the fine control signals as an input.

References Cited
UNITED STATES PATENTS

| | | | |
|---|---|---|---|
| 3,240,290 | 3/1966 | Pohlman | 318—146 |
| 3,350,612 | 10/1967 | Hansen et al. | 318—146 |
| 3,443,186 | 5/1969 | Martin | 318—282 |

ORIS L. RADER, Primary Examiner

K. L. CROSSON, Assistant Examiner

U.S. Cl. X.R.

318—146, 282, 286